United States Patent [19]
Wachter et al.

[11] 3,928,131
[45] Dec. 23, 1975

[54] GRID STRUCTURE FOR NUCLEAR REACTOR FUEL ASSEMBLY

[76] Inventors: William J. Wachter, 3157 Bel Air Drive, Pittsburgh, Pa. 15227; John G. Akey, 630 Garden City Drive, Monroeville, Pa. 15146

[22] Filed: Oct. 24, 1972

[21] Appl. No.: 300,137

Related U.S. Application Data

[63] Continuation-in-part of Ser. No. 850,113, Aug. 14, 1969, abandoned.

[52] U.S. Cl. .................................................. 176/78
[51] Int. Cl. .............................................. G21c 3/30
[58] Field of Search ................................ 176/76, 78

[56] References Cited
UNITED STATES PATENTS

| | | | |
|---|---|---|---|
| 3,068,163 | 12/1962 | Currier, Jr. et al. | 176/78 |
| 3,255,090 | 6/1966 | Leirvik | 176/78 X |
| 3,255,091 | 6/1966 | Frisch | 176/78 |
| 3,301,765 | 1/1967 | Eyre et al. | 176/78 |
| 3,442,763 | 5/1969 | Chetter et al. | 176/78 |
| 3,463,703 | 8/1969 | Crandall | 176/78 |
| 3,679,547 | 8/1972 | Warberg | 176/76 X |
| 3,791,466 | 2/1974 | Patterson et al. | 176/76 X |

*Primary Examiner*—Benjamin R. Padgett
*Assistant Examiner*—P. A. Nelson
*Attorney, Agent, or Firm*—Brown, Murray, Flick & Peckham

[57] ABSTRACT

Described is a nuclear fuel element support system comprising an egg crate-type grid made up of slotted vertical portions interconnected at right angles to each other, the vertical portions being interconnected by means of cross straps which are dimpled midway between their ends to engage fuel elements disposed within openings formed in the egg-crate assembly. The cross straps are disposed at an angle, other than a right angle, to the vertical portions of the assembly whereby their lengths are increased for a given span, and the total elastic deflection capability of the cell is increased. The assembly is particularly adapted for computer design and automated machine tool fabrication.

10 Claims, 9 Drawing Figures

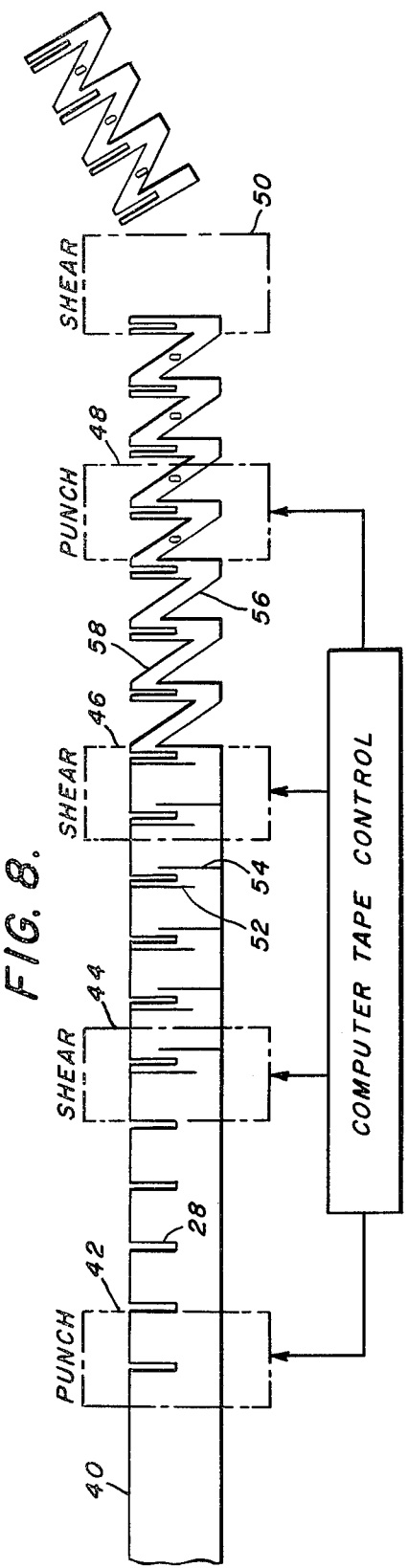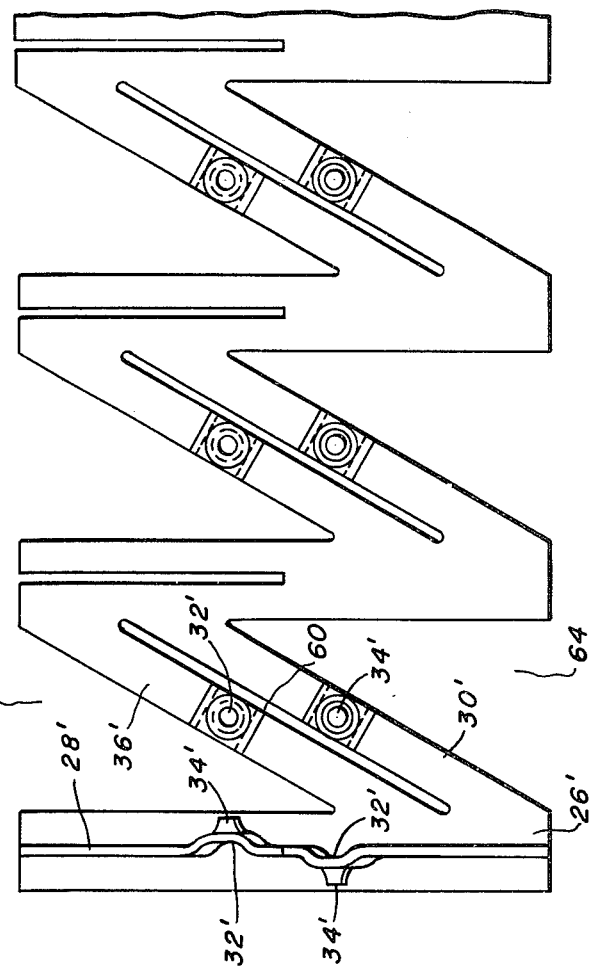

GRID STRUCTURE FOR NUCLEAR REACTOR FUEL ASSEMBLY

CROSS-REFERENCES TO RELATED APPLICATIONS

This application is a continuation-in-part of copending application Ser. No. 850,113, filed Aug. 14, 1969, now abandoned.

BACKGROUND OF THE INVENTION

The evolution of nuclear power plants from the present-day prototype reactors to the reliable production reactors of the future necessitates the development of reliable, simple and inexpensive means for supporting the most critical part of the nuclear reactor system, namely the fuel elements. These elements in most cases are long, slender thin-walled cylinders of stainless steel or zircaloy containing uranium oxide pellets or the like and seal welded on both ends to contain the fission gases and fission fragments separate from the reactor coolant surrounding the fuel rod. When thousands of these very flexible tubes are assembled in the presence of a moderator such as water, a critical nuclear reaction occurs; and the heat generated is used in producing power.

In order to remove the heat from these long slender fuel rods, a coolant, which is usually water, flows past the rods at high velocity, thus providing a source of dynamic excitation that causes the rods to vibrate. In addition to this dynamic loading, the fuel rod cladding is subjected to irradiation and thermally induced static loads that change slowly with time, causing axial and radial changes in dimensions. In order to prevent the rods from moving laterally because of these changes in loading, and to permanently position them in the space available, it is necessary to place lateral supports along the rods. In the usual case, these supports take the form of a grid member which has openings through which the fuel elements extend. The openings in the grid member are formed by a plurality of thin plates or straps which are slotted and interconnected to provide a structural network similar to an egg crate.

In the past, the cross straps of grid structures of this type were not ordinarily flexible. Rather, expansion and contraction of the fuel elements and allowance for vibration was by means of spring fingers which projected inwardly into the openings through which the elongated fuel elements extended. Normally, the straps were stamped to a desired shape, the spring fingers being formed in the same stamping operation. The difficulty with such spring fingers, however, is that geometric stress concentrations eventually result in thermal and neutron flux induced relaxation of the spring fingers and dilution of their resilient or elastic effect. This, in turn, could result in severe impact fretting and rod failures. Furthermore, as nuclear reactors are normally of different sizes and designs, the spring finger approach requires a redesign for each reactor. This design approach cannot be automated readily as by means of a computer program because of the many variables involved.

SUMMARY OF THE INVENTION

As an overall object, the present invention seeks to provide a new and improved grid structure for a nuclear reactor comprising an egg-crate assembly in which the sides of the openings through which the fuel rods extend are themselves flexible in order to allow for expansion and contraction and accommodate vibrational motions.

More specifically, an object of the invention is to provide a grid structure of the type described wherein the sides of the openings through which the fuel rods extend comprise relatively thin straps which are disposed at an angle other than a right angle with respect to the vertical portions of the grid whereby the flexibility of the straps is increased for a given fuel element diameter.

Still another object of the invention is to provide a grid structure of the type described which does not require any special stamping dies and which can be designed by means of a computer program and fabricated from the output of a computer by means of automatically controlled machines.

In accordance with the invention, a grid structure for a nuclear reactor fuel assembly is provided comprising a plurality of slotted members interconnected in an egg-crate assembly to form openings through which elongated fuel elements extend. Each of the openings is bounded by corners formed from generally vertical portions, while cross straps interconnect the vertical portions and are disposed at an angle other than a right angle to the vertical portions. In this manner, the flexibility of the cross straps is increased for a given fuel element diameter; and at the same time the grid structure has no geometric stress concentrations which will eventually result in relaxation of their elastic effect.

In order to alter the flexibility of the cross straps or increase their strength, it is necessary only to vary the angle of the cross straps with respect to the vertical portions of the grid structure and/or vary their widths. The entire forming operation can be accomplished by means of successive stamping and shearing operations requiring no special dies. As a result, any size or design of the grid structure can be produced on the same machine without the necessity for special tooling.

In one embodiment of the invention, a pair of straps extends between a pair of vertical portions of the grid structure in a criss-cross configuration, while in another embodiment, a pair of straps extends across a space between vertical portions in the same direction. In the latter case, the pair of straps is formed by cutting away triangular portions of the slotted members together with a slot between the straps or by cutting three parallel slots. In either case, one strap is dimpled in one direction while the other is dimpled in the opposite direction in order to engage fuel rods on either side of the straps.

The above and other objects and features of the invention will become apparent from the following detailed description taken in connection with the accompanying drawings which form a part of this specification, and in which:

FIG. 6 is an elevational view of another embodiment of the slotted sheet construction of the invention;

FIG. 8 illustrates the manner in which the slotted sheet member of FIG. 3 may be formed.

Figure 1:
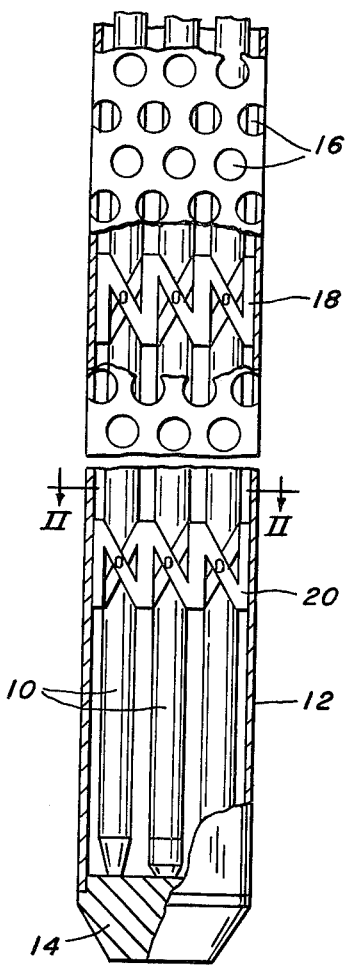
FIG. 1 is a partially sectioned elevational view of a fuel assembly formed in accordance with the principles of the invention.
Figure 2:
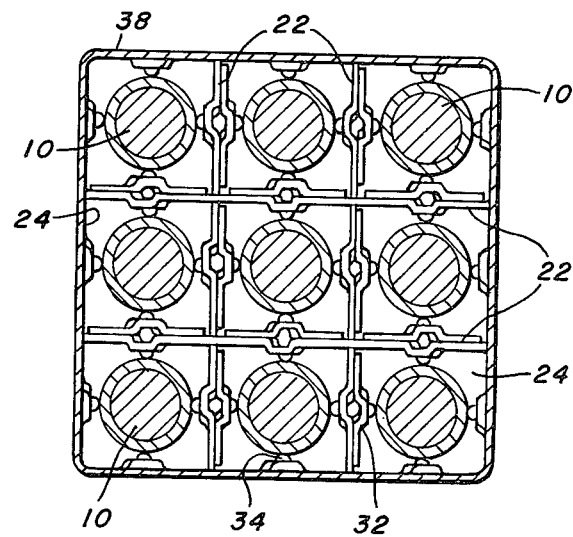
FIG. 2 is an enlarged cross-sectional view of the fuel assembly of FIG. 1 taken along line II—II of FIG. 1.

With reference now to the drawings, and particularly to FIG. 1, in the embodiment of the invention shown herein, a plurality of fuel rods 10 are carried within an enclosure or can 12; however, it should be understood that the grid structure of the present invention is applicable to other types of fuel systems wherein the rods are not disposed within cans but simply suspended within a fluid medium. The fuel rods 10 contain a given quantity of fissionable material and rest on a lower end plate 14 at the bottom of the can 12. The can 12 is provided with flow openings 16 to permit the flow of coolant therethrough. The upper end of the can 12 is normally supplied with a plurality of arms, not shown, adapted for engagement with a remote handling tool such that the can 12 and the fuel rods 10 carried therein can be removed from the reactor if desired.

For purposes of illustration, it will be assumed that nine fuel rods are carried within the can 12; however, they may be increased if desired and, as mentioned above, the can may be entirely eliminated, in which case the assembly is elevated or lowered by a rod extending through the center of the assembly. The fuel rods 10 are received within openings formed in egg-crate supporting grids. Two of such grids are shown in FIG. 1 and identified by the reference numerals 18 and 20.

Figure 3:
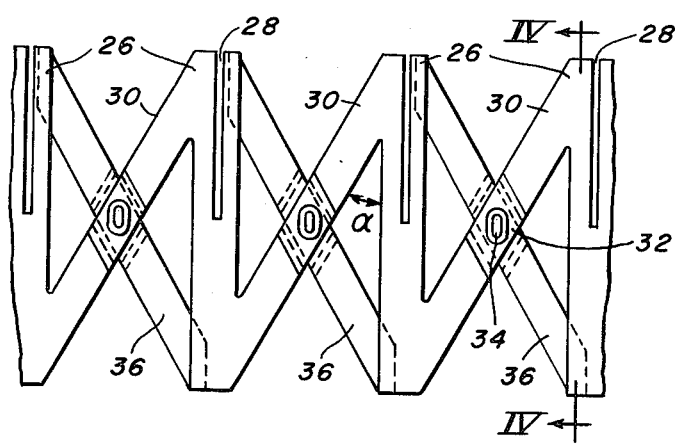
FIG. 3 is an elevational view of one of the slotted sheet members from which the egg-crate assembly of FIG. 2 is formed.
Figure 4:
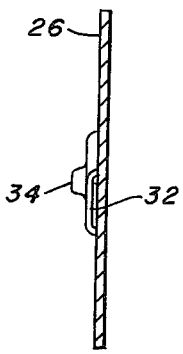
FIG. 4 is a cross-sectional view taken along line IV—IV of FIG. 3.

The details of the grid structure are shown in FIGS. 2–5. With specific reference to FIG. 2, the grid structure is formed from sheet metal members or plates 22 disposed at right angles to each other and forming openings 24 which receive the fuel rods 10. The details of the members 22 are shown in FIGS. 3 and 4. Each includes vertical portions 26 provided with slots 28. Connecting the bottom of one vertical portion to the top of the next vertical portion is a cross strap 30 which is preferably integral with the vertical portions 26 and disposed at an angle thereto. The cross straps 30, as best shown in FIG. 4, are provided with offset portions 32 midway between their ends. Stamped into the offset portions 32 are dimples 34. These dimples are the only parts of the grid structure which actually engage the fuel rods 10, as perhaps best shown in FIG. 2.

The vertical portions 26 and the cross straps 30 thus far described are preferably formed from a single sheet of metal, such as stainless steel, Inconel or possibly zircaloy. Behind the cross straps 30 as shown in FIG. 3 are cross straps 36 which, like the straps 30, are provided with offset portions 32 and dimples 34 which face in a direction opposite to the dimples on straps 30. These latter cross straps 36 are brazed or otherwise securely fastened to the top of one vertical portion 26 and the bottom of the succeeding vertical portion to form criss-cross configurations as shown in FIG. 3. In this manner, and since the offset portions 32 project in opposite directions, the straps 30 may flex relative to, and independent of, the straps 36 and vice versa.

Figure 5:
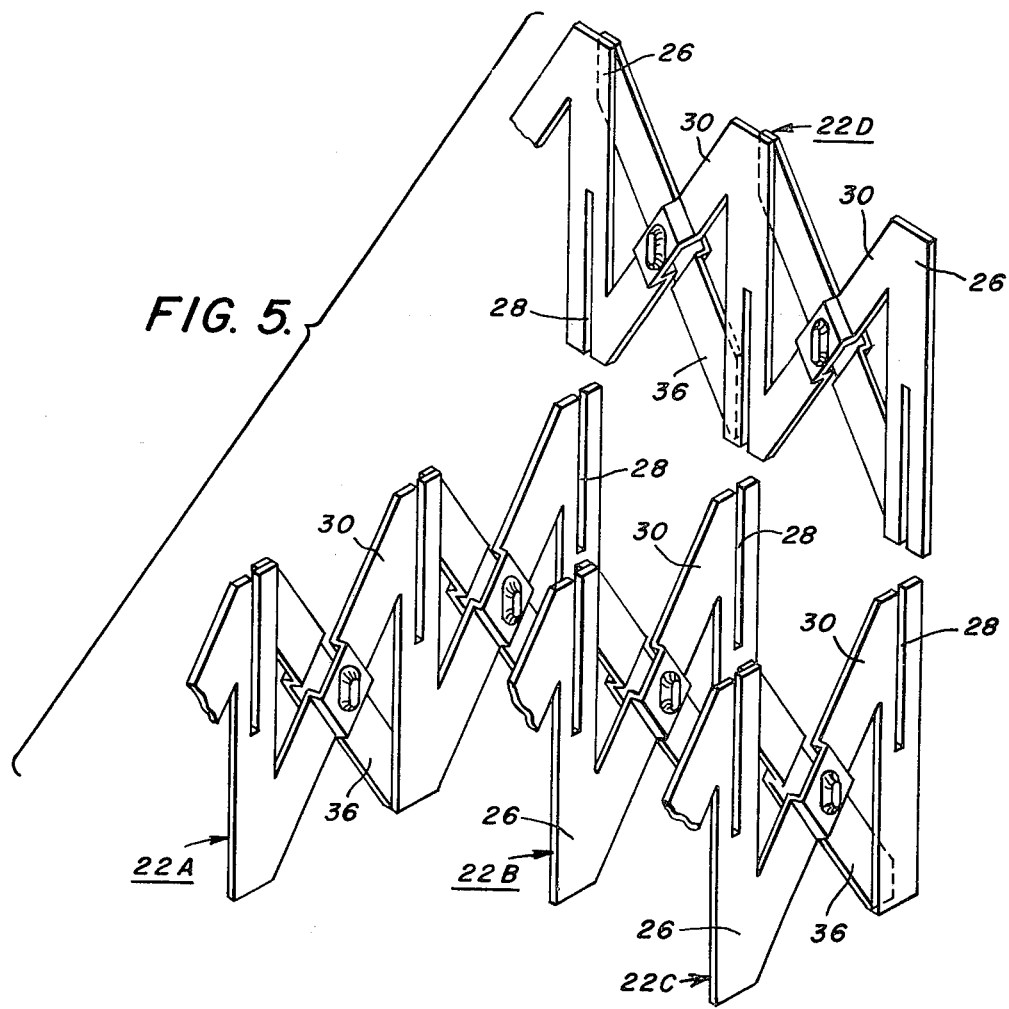
FIG. 5 is a perspective view showing the manner in which the egg-crate assembly of the invention is formed from the slotted sheet members of FIG. 3.

The manner in which a plurality of slotted sheet members, such as that shown in FIG. 3, can be formed into an egg-crate grid assembly is illustrated in FIG. 5. Three slotted sheet configurations 22A, 22B and 22C, for example, are arranged parallel to each other with their slots 28 facing upwardly. A plurality of slotted sheet configurations, one of which is shown in FIG. 5 and identified by the reference numeral 22D, are then disposed at right angles to the configurations 22A–22C with their slots 28 facing downwardly. These latter slotted sheet configurations are then passed downwardly into the slots 28 of the lower sheet configurations with the slots 28 of the upper configurations passing over parts of the vertical portions 26 of the lower configurations until the tops and bottoms of the sheet configurations are flush with each other. The junctions of the perpendicular sheet configurations are then brazed to each other or otherwise securely fastened; and the resulting egg-crate construction is inserted into an encircling border 38 shown in FIG. 2, also formed from vertical portions and cross straps 30 and 36 as best shown in FIG. 1. Finally, the structure formed by the process of FIG. 5 is brazed or otherwise securely fastened to the encircling border 38.

With the arrangement shown, any one of the fuel rods can flex in any direction because of thermal forces and/or vibrational effects. Furthermore, the degree of flexibility afforded by the cross straps 30 and 36 can be seen to be a function of their widths, their thickness, and the angle of which they are disposed to the vertical portions 26. Needless to say, as the angle $\alpha$ shown in FIG. 3 decreases, the length of the cross straps 30 and 36 increases for a given spacing between vertical portions 26. Conversely, as the angle $\alpha$ approaches 90°, the flexibility of the cross straps decreases as their lengths decrease. Hence, the angle $\alpha$ should be an acute angle.

Figure 7:
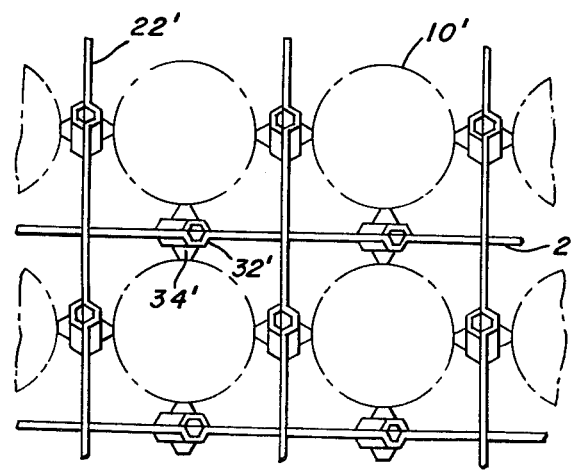
FIG. 7 is a top view of a grid assembly formed from the slotted sheet members of FIG. 6.

Another embodiment of the invention is shown in FIGS. 6 and 7. The arrangement is similar to that previously described and again includes a slotted sheet configuration comprising vertical portions 26' having slots 28' which cooperate with corresponding slots in slotted sheet configurations at right angles thereto. In this case, however, the entire sheet configuration is formed from a single, integral metal strip and is provided with two parallel cross straps 30' and 36'. One strap 30' is provided with an offset portion 32' and a dimple 34' which faces in one direction. The other cross strap 36' is also provided with an offset portion 32' and a dimple 34'; but in this case the dimple and offset face in the opposite direction to engage a fuel rod 10 on the other side of the slotted sheet configuration.

As was mentioned above, the grid structure of the invention is particularly adapted for computer design and numerically controlled tape machine tools. For example, the slotted sheet configuration of FIG. 3 can be formed in accordance with the process shown in FIG. 8. The starting material is a length of metal sheet material 40 which passes through a punch 42, a first shear 44, a second shear 46, a second punch 48 and a severing shear 50. Preferably, the various tools shown in FIG. 8 are spaced such that the strip can be advanced and then stopped, whereupon an operation is performed on the strip simultaneously by each of the tools.

When the strip is under the punch 42, the slots 28 are punched therein. Then, as it advances to the first shear 44, parallel cuts 52 and 54 are formed therein. Thereafter, when it is under the shear 46, angular cuts 56 and 58 are formed, thereby removing blanks which form the cross strap 30. When the strip is under the punch 48, the offset portion 32 and the dimple 34 are formed. Finally, the thus-formed slotted sheet configuration can be cut to length by means of shear 50.

All of the tools shown in FIG. 8 can be controlled by means of a computer tape control system, schematically illustrated by the reference numeral 60. It will be appreciated that the only variables in the process are the lengths of the cuts 52 and 54 and the angles at which the cuts 56 and 58 are made. These, in turn, can be determined by means of a computer program from the various factors affecting the operation of a nuclear reactor such as fuel rod spacing, clad thickness, clad properties, distance between supports, coolant velocity, coolant properties, and nuclear and thermal effects. The program performs the necessary calculations to transform the above input data into a product in the form of design drawings and tape instructions used to control the apparatus of FIG. 8.

Since nuclear reactors vary widely in their design and size, the invention provides a reliable, inexpensive means for supplying support systems for all reactor designs without the need for large capital investments in unique tools and dies that are good only for one specific reactor design.

Figure 9:
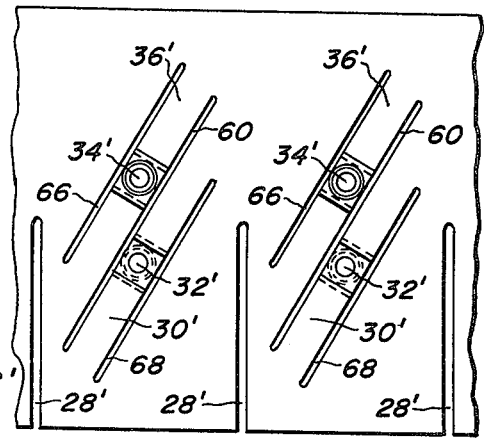
FIG. 9 illustrates an embodiment of the invention similar to that of FIG. 6 but wherein two parallel straps are formed by punching three parallel elongated openings in the slotted members of the egg-crate assembly of the invention.

In FIG. 9, another embodiment of the invention is shown similar to that of FIG. 6. Accordingly, elements of FIG. 9 which correspond to those of FIG. 6 are identified by like reference numerals. In the embodiment of FIG. 6, the two parallel cross straps 30' and 36' are formed by a cut-away portion 61 of slot-like configuration and two cut-away portions 62 and 64 of triangular configuration. In the embodiment of FIG. 9, however, the triangular cut-away portions 62 and 64 are replaced by cut-away portions 66 and 68, both of slot-like configuration. In either case, the result is essentially the same with the edges of the cut-away portions 61, 62 and 64 (or 61, 66 and 68) being at an oblique angle with respect to the axes of the fuel tubes which are held in position by the egg-crate configuration.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a grid structure for a nuclear reactor fuel assembly, a plurality of slotted members interconnected to each other to form an egg-crate assembly having openings through which elongated fuel elements extend, each of said openings being bounded by corners formed from vertical portions, and at least two cross straps at each side of each of said openings, said cross straps interconnecting said vertical portions and being disposed at an acute angle with respect to the vertical axes of said vertical portions whereby the flexibility of said cross straps is increased for a given fuel element diameter, each cross strap extending from the top of one vertical portion to the bottom of an adjacent vertical portion in a slotted member.

2. The grid structure of claim 1 wherein said cross straps are provided with dimpled portions which engage an elongated fuel element disposed within said egg-crate assembly.

3. The grid structure of claim 1 wherein there are two cross straps interconnecting one of said vertical portions to the next successive vertical portion.

4. The grid structure of claim 3 wherein each of said cross straps interconnecting adjacent vertical portions is provided with a centrally disposed dimple, said dimples in the respective cross straps facing in opposite directions.

5. The grid structure of claim 4 wherein said cross straps cross each other in a criss-cross configuration.

6. The grid structure of claim 4 wherein said cross straps are parallel to each other.

7. The grid structure of claim 5 wherein one of said cross straps is integral with said vertical portions and the other of said cross straps is a separate element secured to said vertical portions.

8. The grid structure of claim 6 wherein both of said cross straps are integral with said vertical portions.

9. In a nuclear reactor fuel element assembly including a plurality of fuel containing tubes forming a bundle, said tubes being closed and spaced from each other at each end of said bundle, and means intermediate the ends of said tubes for holding said tubes against lateral displacement; the improvement in said means for holding the tubes against lateral displacement comprising: a plurality of interconnected bands forming an egg-crate assembly having openings through which said tubes extend, the bands having pairs of oppositely-facing rigid dimples embossed therein at spaced locations along their lengths, the oppositely-facing rigid dimples engaging sides of adjacent tubes in said bundle to provide lateral support therefor, a portion of the band between the dimples in each oppositely-facing pair of dimples being cut away, and cut-away portions in said band on the sides of each pair of dimples opposite the cut-away portion between the dimples, edges of said cut-away portions being at an oblique angle with respect to the axes of said tubes.

10. The assembly of claim 9 wherein said cut-away portions are all in the form of slots, one slot being between the dimples and the other two slots being on the sides of the dimples opposite said one slot.

* * * * *